(12) United States Patent
Becker et al.

(10) Patent No.: US 12,071,829 B2
(45) Date of Patent: Aug. 27, 2024

(54) WELLHEAD ADAPTOR FOR DUAL CONCENTRIC TUBING FOR WELL OPERATIONS

(71) Applicant: DUCON—BECKER SERVICE TECHNOLOGY, LLC., Ventura, CA (US)

(72) Inventors: Billy G. Becker, Ventura, CA (US); David Charles Daniel, Missouri City, TX (US)

(73) Assignee: DUCON—BECKER SERVICE TECHNOLOGY, LLC, Ventura, CA (US)

( * ) Notice: Subject to any disclaimer, the term of this patent is extended or adjusted under 35 U.S.C. 154(b) by 0 days.

(21) Appl. No.: 16/833,896

(22) Filed: Mar. 30, 2020

(65) Prior Publication Data

US 2020/0318452 A1   Oct. 8, 2020

Related U.S. Application Data (60) Provisional application No. 62/829,132, filed on Apr. 4, 2019.

(51) Int. Cl.
*E21B 33/038* (2006.01)
*E21B 17/18* (2006.01)
*E21B 43/12* (2006.01)

(52) U.S. Cl.
CPC ............ *E21B 33/038* (2013.01); *E21B 17/18* (2013.01); *E21B 43/121* (2013.01)

(58) Field of Classification Search
CPC ....... E21B 33/038; E21B 17/18; E21B 43/121
USPC ......................................................... 166/368
See application file for complete search history.

(56) References Cited

U.S. PATENT DOCUMENTS

| | | | |
|---|---|---|---|
| 3,065,807 A | 11/1962 | Wells | |
| 3,216,512 A | 11/1965 | Grable | |
| 3,489,438 A * | 1/1970 | McClure | E21B 17/18 285/123.15 |
| 3,664,441 A | 5/1972 | Carey | |
| 3,786,878 A | 1/1974 | Chapman | |
| 3,943,618 A | 3/1976 | Perkins | |
| 4,067,596 A | 1/1978 | Kellner et al. | |
| 4,100,981 A | 7/1978 | Chaffin | |
| 4,149,739 A | 4/1979 | Morris | |
| 4,938,289 A * | 7/1990 | Van Bilderbeek | E21B 33/043 166/368 |
| 4,997,048 A * | 3/1991 | Isom | E21B 17/003 166/57 |

(Continued)

OTHER PUBLICATIONS

International Search Report/Written Opinion in related/corresponding PCT Application No. PCT/US2019/054387 dated Feb. 4, 2020.

(Continued)

*Primary Examiner* — Matthew Troutman
*Assistant Examiner* — Patrick F Lambe
(74) *Attorney, Agent, or Firm* — Morgan, Lewis & Bockius LLP (57) ABSTRACT

A wellhead adaptor for fluidly connecting to a well tubing system, the wellhead adaptor including an outer body having a bore; and an inner body located inside the bore and having an annulus A. The inner body and the outer body define an annulus B, which is concentric to annulus A.

7 Claims, 12 Drawing Sheets

(56) References Cited

U.S. PATENT DOCUMENTS

| | | | |
|---|---|---|---|
| 5,139,090 A * | 8/1992 | Land | E21B 23/01 |
| | | | 166/117.7 |
| 5,775,736 A | 7/1998 | Svetlik | |
| 5,706,598 A | 9/1998 | Amani | |
| 5,911,278 A | 6/1999 | Reitz | |
| 6,305,476 B1 | 10/2001 | Knight | |
| 7,134,514 B2 | 11/2006 | Riel et al. | |
| 7,740,061 B2 * | 6/2010 | Van Bilderbeek | E21B 33/03 |
| | | | 166/89.1 |
| 8,539,976 B1 * | 9/2013 | Rodgers, Jr. | E21B 34/02 |
| | | | 137/512 |
| 8,777,273 B2 | 7/2014 | Syse et al. | |
| 10,718,457 B2 | 7/2020 | Haynes et al. | |
| 2003/0164240 A1 | 9/2003 | Vinegar et al. | |
| 2004/0182437 A1 | 9/2004 | Messick | |
| 2005/0061369 A1 | 3/2005 | De Almeida | |
| 2006/0283606 A1 | 12/2006 | Partouche et al. | |
| 2007/0227739 A1 | 10/2007 | Becker et al. | |
| 2007/0235197 A1 | 10/2007 | Becker et al. | |
| 2011/0067883 A1 | 3/2011 | Falk et al. | |
| 2011/0259597 A1 * | 10/2011 | Bjerke | E21B 33/0355 |
| | | | 166/368 |
| 2014/0041863 A1 | 2/2014 | Dowling et al. | |
| 2014/0116725 A1 | 5/2014 | Wollmann | |
| 2014/0179448 A1 | 6/2014 | Collins et al. | |
| 2014/0284065 A1 | 9/2014 | Fraignac et al. | |
| 2015/0315869 A1 * | 11/2015 | Landry | E21B 33/03 |
| | | | 166/97.1 |
| 2017/0370162 A1 | 12/2017 | Carrois et al. | |
| 2018/0320492 A1 * | 11/2018 | Shen | E21B 43/34 |
| 2019/0376369 A1 | 12/2019 | Daniel et al. | |
| 2020/0318452 A1 | 10/2020 | Becker et al. | |

OTHER PUBLICATIONS

International Preliminary Report on Patentability, PCT/US2019/054387, dated Aug. 10, 2021.

International Search Report and Written Opinion dated Jun. 22, 2020, in related/corresponding PCT Application No. PCT/US2020/024247.

International Preliminary Report on Patentability, PCT/US2020/024247, dated Sep. 28, 2021.

International Search Report and Written Opinion dated Jun. 22, 2020, in related/corresponding PCT Application No. PCT/US2020/024230.

International Preliminary Report on Patentability, PCT/US2020/024230, dated Sep. 28, 2021.

* cited by examiner

WELLHEAD ADAPTOR FOR DUAL CONCENTRIC TUBING FOR WELL OPERATIONS

BACKGROUND

Technical Field

Embodiments of the subject matter disclosed herein generally relate to artificial gas lift systems, and more specifically, to wellhead adaptors that support a tubing system while in a well.

Discussion of the Background

After a well is drilled to a desired depth relative to the surface, and a casing protecting the wellbore is installed, cemented in place, and perforated for connecting the wellbore to the subterranean formation, it is time to extract the oil and/or gas and/or any other fluid from the formation. Although the discussions herein are focused on lifting oil from the well, those skilled in the art would understand that the methods discussed herein are applicable to lifting any fluid from an underground reservoir.

Figure 1:
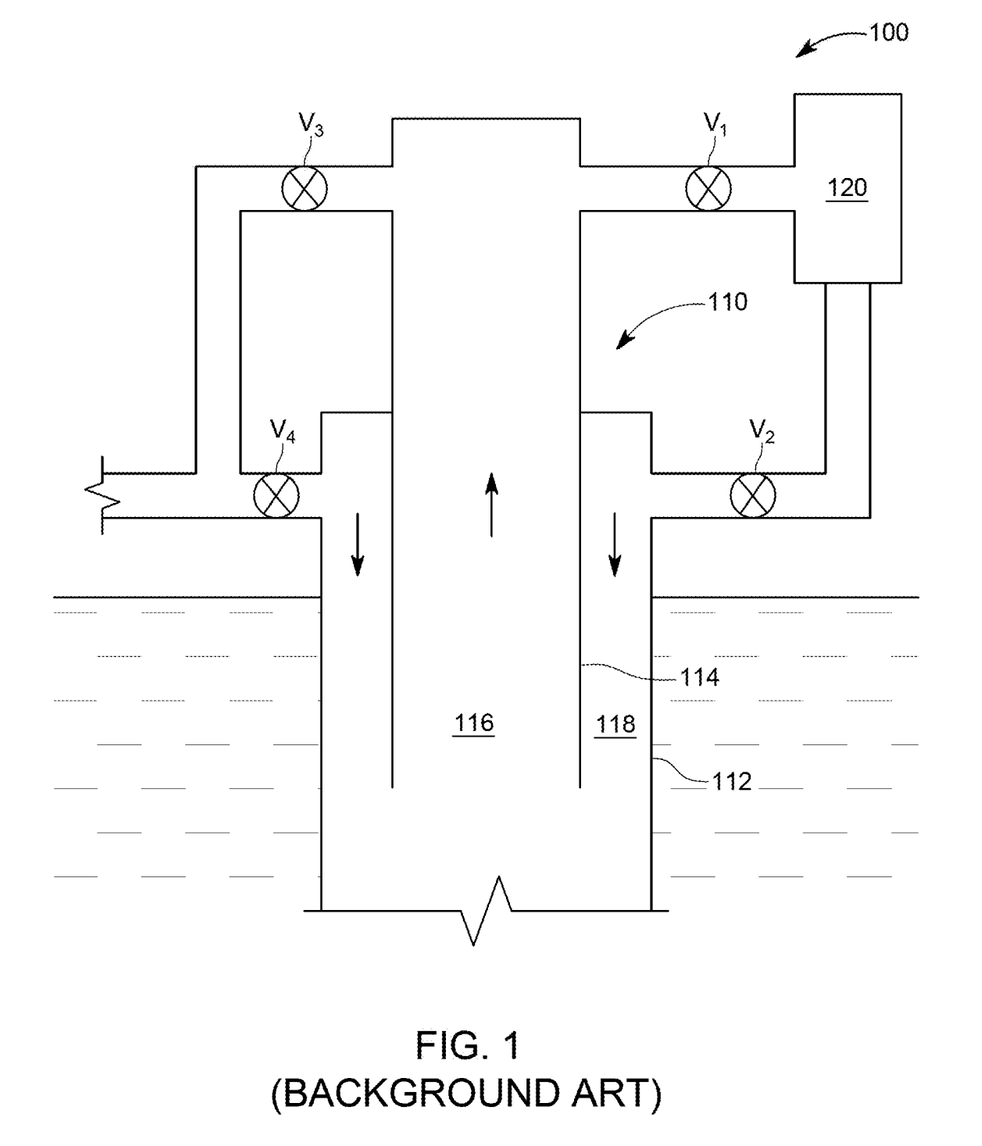
FIG. 1 illustrates a traditional wellhead of a well that is configured to handle a single tubing string.

The typical wellhead adaptor is designed to support a single tubing string that is deployed in the casing of the well, as illustrated in FIG. 1. FIG. 1 shows a tubing system 100 that includes a wellhead adaptor 110 that is fluidly connected to the casing 112, but also to the single tubing string 114. The tubing string 114 has a bore 116, and forms an annulus 118 with the casing 112. Thus, the existing wellhead adaptors 110 accommodate only those tubing systems that have two fluid conduits 116 and 118, which are independent from each other. FIG. 1 further shows a compressor 120 fluidly connected to the tubing string 114 and also to the casing 112 so that a pressured gas may be pumped from the compressor, along the annulus 118, into the well, and oil may be lifted through bore 116. Various valves V1 to V4 located between the compressor 120 and the wellhead adaptor 110 ensure that the gas is pumped into the well and the oil is lifted to the surface.

However, more recent systems, as disclosed in U.S. Provisional Patent Application No. 62/801,396 (filed on Feb. 5, 2019, and assigned to the assignee of this application, the entire disclosure of which is incorporated herein by reference), use modified tubing strings that employ three or more fluid conduits that are independent of each other. Because the wellhead adaptor 110 shown in FIG. 1 is not equipped to handle more than two fluid conduits, this wellhead adaptor cannot be used with such novel systems that have three or more fluid conduits.

Figure 2:
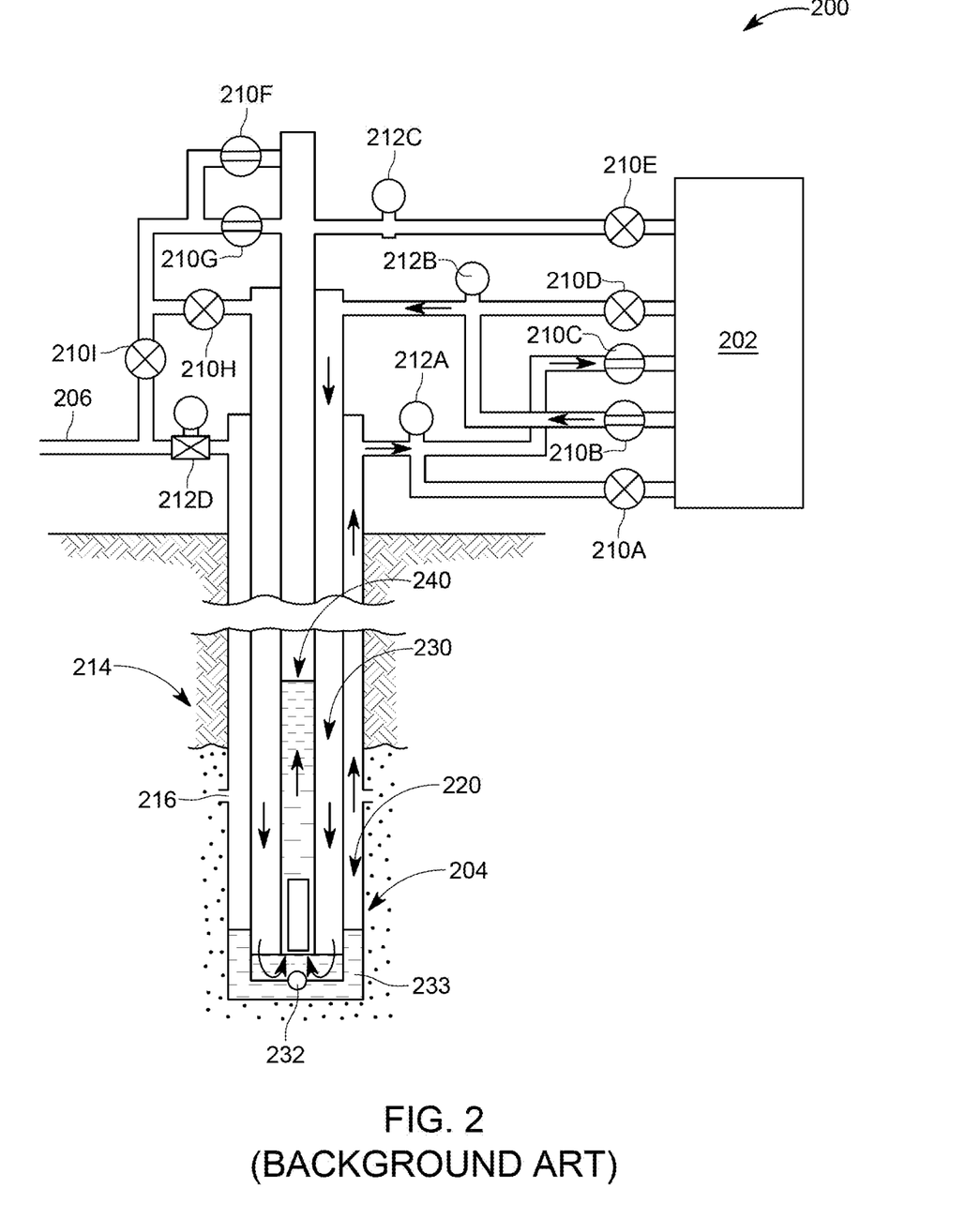
FIG. 2 illustrates another wellhead of a well that handles two tubing strings.

An artificial lift method that was only applied in the field as a solution to unloading gas wells that were offline as a result of having standing fluid levels above the perforations in a vertical well is the Calliope system, which is schematically illustrated in FIG. 2 (which corresponds to FIG. 5 of U.S. Pat. No. 5,911,278). The Calliope system 200 utilizes a dedicated gas compressor 202 to lower the producing pressures (compressor suction) a well 204 must overcome while using the high pressure discharge from the compression (compressor discharge) as a source of gas lift. The Calliope system was successful at taking previously dead gas wells and returning them to economic production levels and improving gas recoveries from the reservoir. Each wellsite installation has a programmable controller (not shown) that operates a manifolded system (which includes plural valves 210A to 210I) to automate the connection of the compressor suction to the casing 220, production tubing 230, and/or an inner tubing 240, or conversely, to connect the compressor discharge to these elements. Various pressure gauges 212A to 212D are used to determine when to open or close the various valves 210A to 210I. The production tubing 230 has a one way valve 232 that allows a fluid 233 from the casing 220 to enter the lower part of the production tubing 230 and the inner tubing 240, but not the other way. The fluid flows from the formation 214 into the casing 220, through holes 216 made during the perforating operation, and into the casing production tubing annulus. By connecting the discharge and suction parts of the compressor 202 to the three tubes noted above, the fluid from the bottom of the well 204 is pumped up the well, through the inner tubing 240.

The configuration shown in FIG. 2 does not provide any detail about the existence of a wellhead adaptor, how such wellhead adaptor is attached to the various pipes, how the wellhead adaptor insulates the pipes from each other, or what steps are taken to physically connect the wellhead adaptor to the various pipes.

Thus, there is a need for a wellhead adaptor that efficiently and easily connects to a multi-string tubing system while also provides the safety measures that are expected for this field.

SUMMARY

According to an embodiment, there is a wellhead adaptor for fluidly connecting to a well tubing system, the wellhead adaptor including an outer body having a bore and an inner body located inside the bore and having an annulus A. The inner body and the outer body define an annulus B, which is concentric to annulus A.

According to another embodiment, there is a well system for lifting a fluid from a well. The well system includes a wellhead adaptor; and a tubing system that is mechanically attached to the wellhead adaptor. The tubing system attaches to the wellhead adaptor with a single rotational motion.

According to still another embodiment, there is a method for deploying a wellhead adaptor. The method includes connecting the wellhead adaptor with a single rotational motion to a tubing system that includes an inner tubing string and an outer tubing string, where the inner tubing string is concentric to the outer tubing string.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a wellhead adaptor that is configured to be attached to a tubing system that includes two concentric tubular strings that are used for lifting a fluid from a deviated (e.g., horizontal) well. The embodiments discussed herein may be used with a vertical well, a horizontal well or any type of well.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Before discussing the novel wellhead adaptor, and for a better understanding of the features of this adaptor, a short discussion of a dual-string, concentric, tubing system is believed to be in order.

Figure 3:
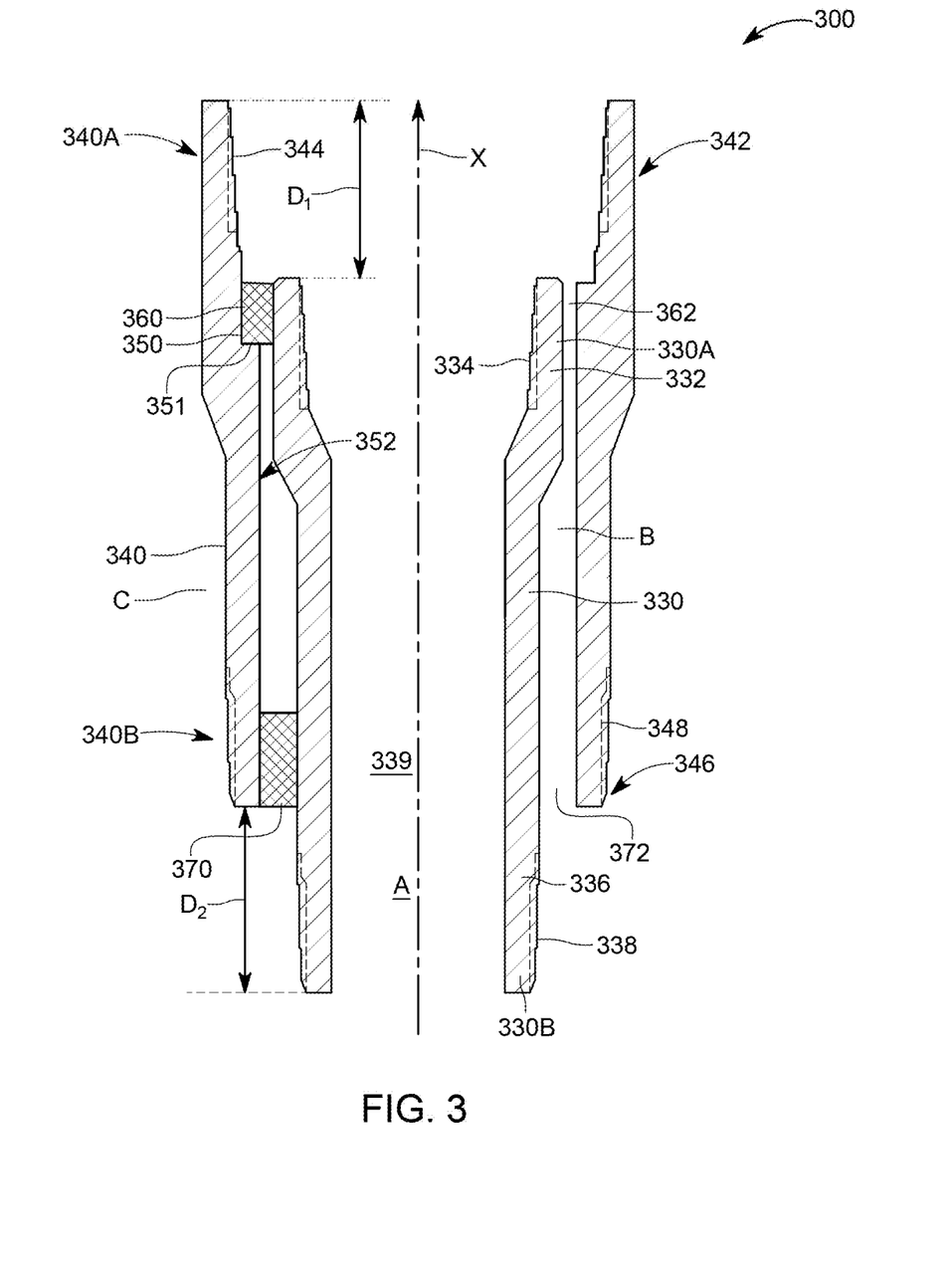
FIG. 3 illustrates a joint tube element that includes concentric inner and outer pipes fixedly connected to each other.

FIG. 3 shows a single joint pipe element 300 having an inner pipe 330 and an outer pipe 340. The upstream end 340A of the outer pipe 340 is shaped as a tubular box 342. This box can be formed, for example, by upsetting or forging (or any known process). In this embodiment, an internal thread (female) 344 is formed on the internal part of the tubular box 342. The downstream end 340B of the outer pipe 340 is shaped as a tubular pin 346 having an external thread (male) 348, that would mate with a corresponding thread 344 of a next single joint pipe element (not shown) or a connector (not shown) or a mandrel (not shown).

Two or more upstream lugs 360 are attached (for example, welded) to the inner pipe 330 as shown in FIG. 3. The term "lug" is used herein to include any means for connecting the inner pipe to the outer pipe in order to transfer rotational torque and share tensile and compression loads. This term may include, but it not limited to, a slug, a weld, a centralizer, or full or partial length feature on the inner or outer string, or a combination of features and other parts. Further, the term may include a key formed in one pipe and an extension or shoulder formed in the other pipe, such that the extension or shoulder is configured to engage the key. Other similar or equivalent mechanisms are intended to be included in this term as long as the two pipes are attached to each other in such a way to transfer rotational torque from the outer pipe to the inner pipe and share tensile and compression loads. Note that FIG. 3 shows only a single upstream lug 360 as this figure is a longitudinal cross-section view of the single joint pipe element 300. However, more lugs may be used at this location as long as a fluid is allowed to pass the lugs along the longitudinal axis X. The shape of these lugs may be selected as necessary by the manufacturer of the joint pipe element. The inner pipe 330 is shown having a bore (called herein annulus A as it is customary in the industry, although a bore is different from an annulus), and the slots 362 between the upstream lugs 360 allow the gas or fluid to pass from one single joint pipe element to another through annulus B. The annulus A is in fact the fluid path of the inner tubing string and the annulus B is the fluid path of the outer tubing string, wherein the inner and outer tubing strings form the tubing system.

Lug 360 is in contact with the outer pipe 340 and may be attached to it also by welding. However, in another embodiment, the lugs 360 are welded to the inner pipe 330 and then this assembly is pressed inside the outer pipe 340, with no welding. The lugs 360 may engage with a corresponding groove 350 formed in one of the pipes. The lug 360 advances along groove 350 until touching a shoulder 351. Shoulder 351 is calculated such that the inner pipe is offset from the outer pipe with a desired distance (D1 in FIG. 3). Because the size of the lugs may be a little larger than the size of the annulus B, by pressing the lugs along the groove 350, between the inner and outer pipes, makes the connection of the inner and outer pipes to be fixed, i.e., a torque applied to the outer pipe is transmitted to the inner pipe and vice versa, and thus, the inner pipe cannot rotate relative to the outer pipe or vice versa, i.e., the two pipes act as a single unit under rotation. Other methods for attaching the lugs to the inner and outer pipes may be used. It is noted that the inner pipe cannot rotate relative to the outer pipe for any of the joint pipe elements discussed herein because of these lugs or other mechanisms that are used to connect the two pipes. In this way, the torque applied to the outer pipe of a joint pipe element is conveyed though the lugs to the inner pipe, thus insuring that all threads in the joint pipe element are sufficiently tightened when forming a tubing system. This is valid irrespective of the manufacturing method selected for forming the joint pipe element, i.e., the lugs are welded, or just pressed, or forged, etc.

Still with regard to FIG. 3, in one application, the grooves 350 are formed in the bore 352 of the outer pipe 340 so that, when the inner pipe 330 and the upstream lugs 360 are placed inside the outer pipe 340, a corresponding lug 360 enters the groove and moves along the X axis until it is stopped by the shoulder 351. The number of grooves coincides with the number of lugs. The groove 350 is made so that an alignment of the inner pipe relative to the outer pipe along the longitudinal axis X is achieved. For example, in the embodiment of FIG. 3, the top most part of the inner pipe 330 is offset from the top most part of the outer pipe 340 by a distance D1. In one application, the distance D1 is between a couple of millimeters to a couple of centimeters. In still another application, the distance D1 may be zero, i.e., the top most part of the outer pipe may be flush with the top most part of the inner pipe. The distance D1 is planned before assembling the outer and inner pipes and the groove 350 and the shoulder 351 are made to achieve this distance.

Still with regard to FIG. 3, the inner pipe 330 is made to have an upstream end 330A and a downstream end 330B that are both treaded. In this embodiment, the upstream end 330A is shaped as a tubular box 332 that has internal (female) threads 334. The tubular box 332 may be made, in one application, by upset forging, as discussed later. Other methods may be used to form this part. The downstream end 330B is shaped as a tubular pin 336 having an external (male) thread 338. The inner pipe 330 has a bore 339 (that forms annulus A of the inner tubular string) through which a valve may be lowered into the well or oil may be brought to the surface. In the following, the bore 339 of the inner pipe 330 is called annulus A, the passage between the inner pipe 330 and the outer pipe 340 is called annulus B, and the passage between the outer pipe 340 and the casing (not shown) is called annulus C.

For aligning the inner pipe 330 relative to the outer pipe 340, in addition to the upstream lugs 360 discussed above, downstream lugs 370 may be used at the downstream end of the outer and inner pipes. Two or more downstream lugs 370 may be used. FIG. 3 shows that slots 372 are formed between the downstream lugs 370, similar or not to the slots 362, for allowing a gas or fluid to pass by. Although FIG. 3 shows the inner pipe 330 being concentric relative to the outer pipe 340, it is possible that only one or both ends of the two pipes to be concentric, while the body (the part between the ends) is not concentric (for example, when a side pocket is implemented in the inner tube). One or both ends of the inner and outer pipes are concentric so that one joint pipe element can be attached to another joint pipe element or a connector by a single rotational motion. The term "single rotational motion" is used herein to mean that the inner and outer pipes are simultaneously being attached to other inner and outer pipes with one rotation that is applied, for example, to the outer pipe. The one rotation means a 20 angle rotation, or a 180 angle rotation, or a 360 angle rotation, or a 450 angle rotation, or any other number. Note that the terms "downstream" and "upstream" in this application refer to a direction toward the toe of the well and a direction toward the head of the well, respectively.

Figure 4:
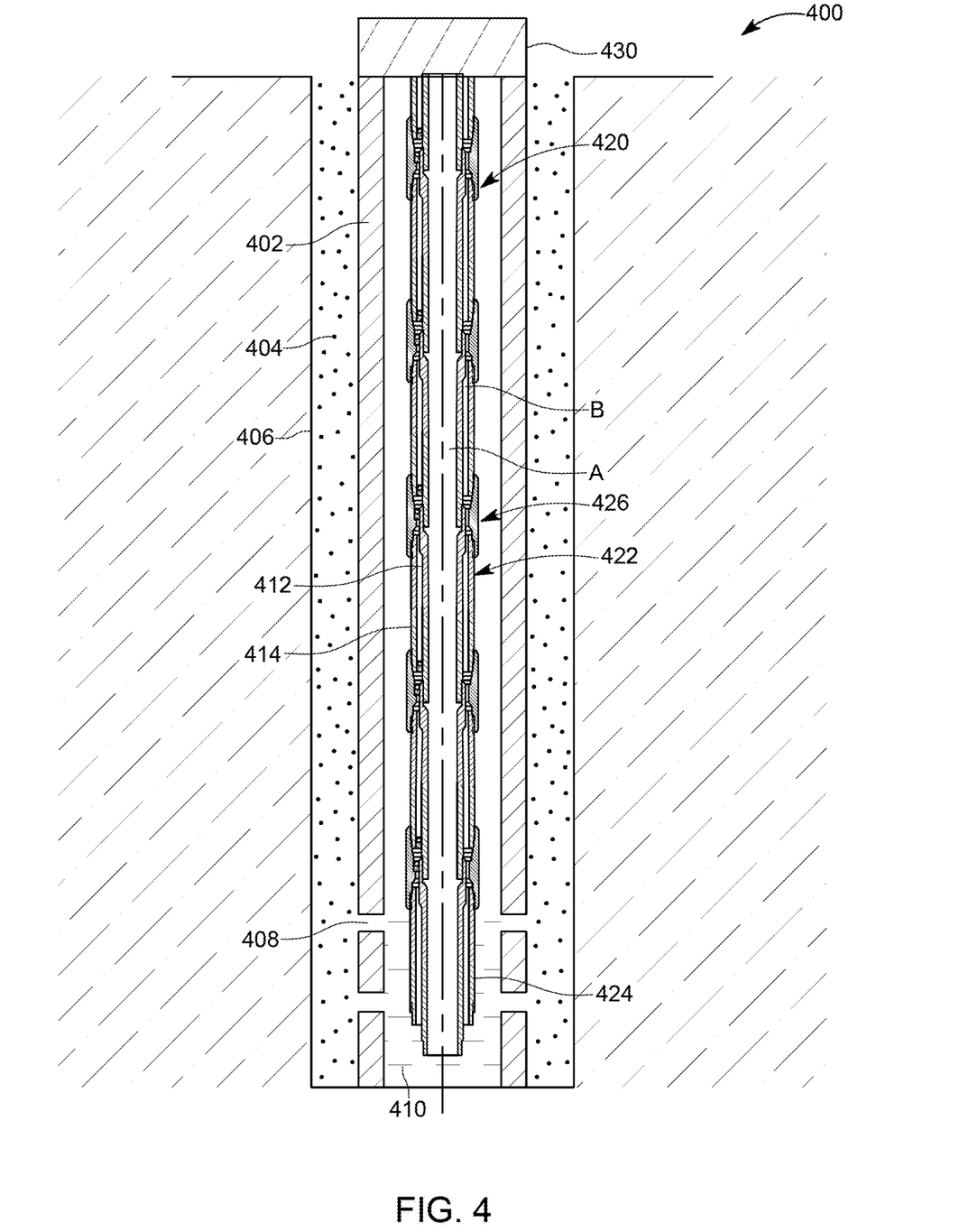
FIG. 4 illustrates a tubing system that uses plural joint tube elements and dual housing connectors.

FIG. 4 shows a well system 400 in which a casing 402 has been installed. Casing 402 has been cemented with cement 404 inside the borehole 406. Plural perforations 408 have been formed at least at the bottom of the well (in fact, these perforations are formed at various stages of the casing) so that oil 410 from the formations around the well 406 is flowing inside the casing 402. A tubing system 420 has been lowered into the casing 402 to artificially lift the oil. The tubing system is attached to a wellhead adaptor 430. The tubing system 420 is made of plural joint pipe elements 422 (which correspond to the joint pipe element 300 shown in FIG. 3). The number of the joint pipe elements may be any integer equal to or larger than 2. The most distal joint pipe element 424 may have a configuration different from the joint pipe element 422.

The dual simultaneous connection between two joint pipe elements can also be achieved by using a connector (i.e., a single housing or a dual housing connector; the term "connector" is used herein to refer to either of these two connectors) as now discussed. Note that a dual housing connector 426 connects simultaneously to both the inner and outer pipes of two joint pipe elements. A single housing connector (not shown) connects only to inner pipes or only to outer pipes. The most distal joint pipe element 424 (e.g., the chamber pump), may be connected at its upstream end with the same dual housing connector 426, while its downstream end may have no connection. Each of the joint pipe element 422 has an inner pipe and an outer pipe similar to the joint pipe element 300. When the joint pipe elements 422 and the dual housing connectors 426 are all connected to each other, they form an inner tubular string 412 and an outer tubular string 414 as shown in FIG. 4. The inner tubular string 412 has a continuous bore A, which is called herein annulus A, and the outer tubular string 414 defines the annulus B, together with the inner tubular string 412. The pressure in each of the tubular strings can be controlled independent of the other tubular string.

Figure 5:
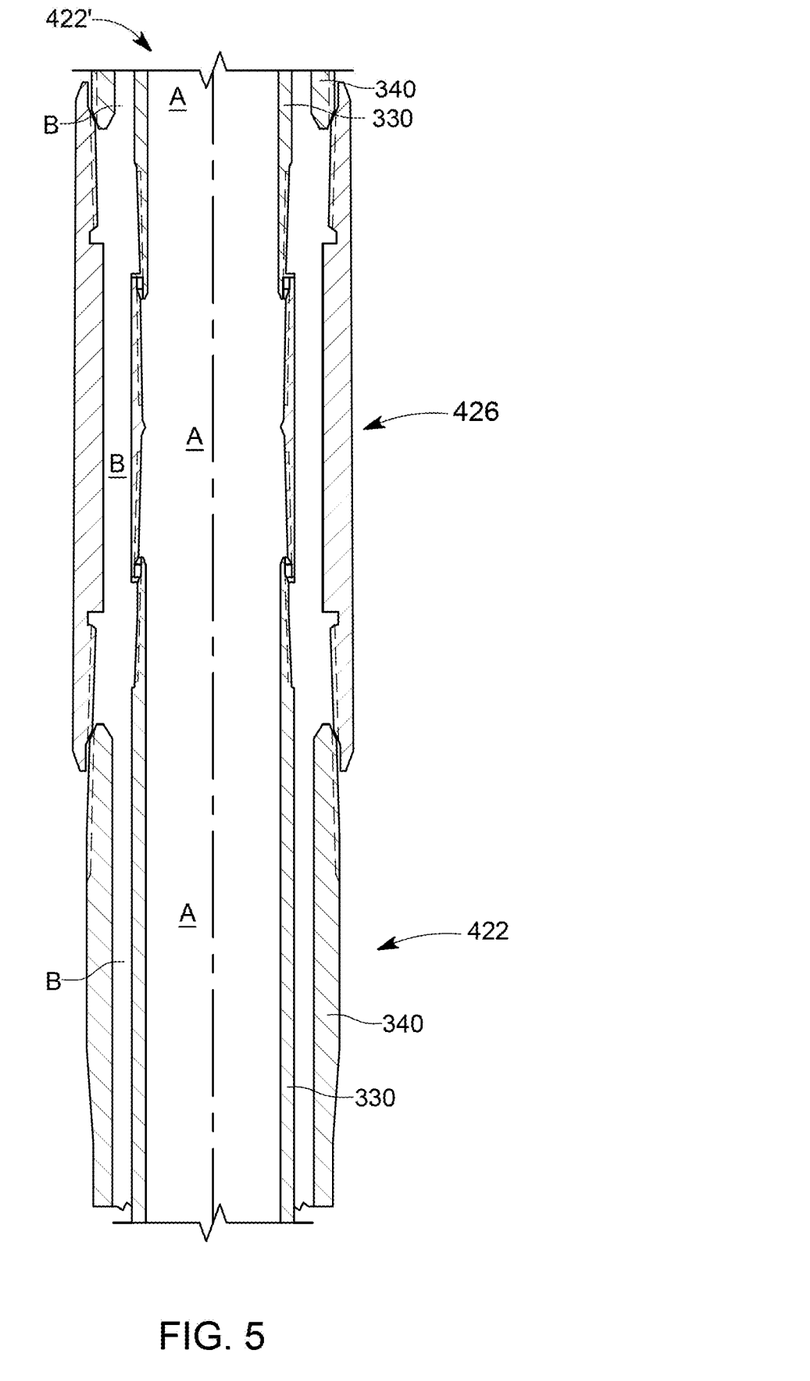
FIG. 5 illustrates a dual housing connector being attached to two joint pipe elements.
Figure 6:
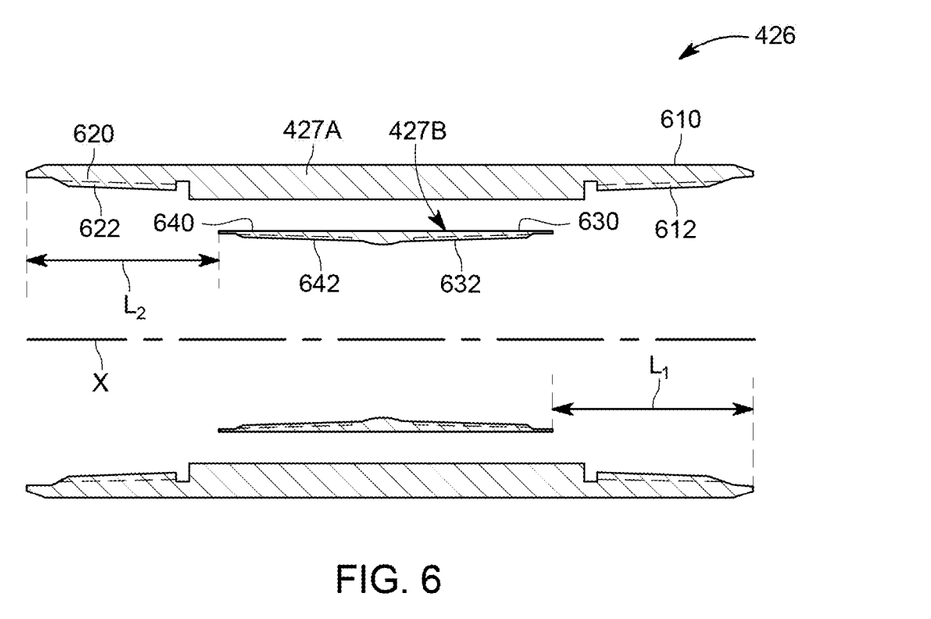
FIG. 6 illustrates the connector having the dual housing.
Figure 7:
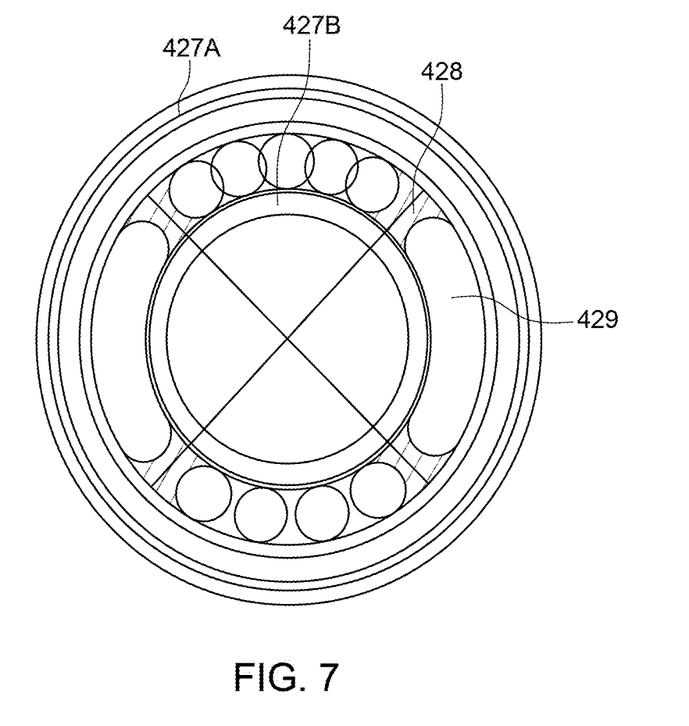
FIG. 7 illustrates a cross-section of the dual housing connector.

In one embodiment, as illustrated in FIG. 5, a dual housing connector 426 is configured to connect both the inner pipes and the outer pipes of the joint pipe elements 422 and 422' to each other, to form the annulus A and the annulus B. FIG. 6 shows a cross-section through the dual housing connector 426. The dual housing connector 426 has an outer body 427A that connects the outer pipes of the joint pipe elements and an inner body 427B that connects the inner pipes of the joint pipe elements. The inner body 427B is attached to the outer body 427A, as shown in FIG. 7, by one or more webs (or bridges) 428. In one application, the outer body, the inner body and the one or more webs are integrally formed from a single solid part. Holes or slots 429 or both are formed between the two bodies and the webs for allowing the fluid in annulus B to move from one joint pipe element to another one. In one application, the slot has an oval form. Other shapes may be used for the slot 429. In one embodiment, the two bodies 427A and 427B are made of a same piece of material, i.e., they are an integral body.

Returning to FIG. 6, the outer body 427A is shaped as an upstream tubular box 610 that has inner threads 612 and as a downstream tubular box 620 that has inner threads 622. The inner threads 612 and 622 are configured to engage the corresponding threads of the outer pipes of the joint pipe elements or a joint pipe element and one of a tool or production tubing. In one application, the threads of the inner pipes simultaneously engage the corresponding threads of the dual housing connector. The threads of the inner and outer pipes may be configured to have the same length. However, in one application, the threads of the outer pipes may be longer that the threads of the inner pipes.

The inner body 427B of the dual housing connector is shaped at one end as an upstream tubular box 630 that has inner threads 632 and is shaped at another end as a downstream tubular box 640 that has inner threads 642. The inner threads 632 and 642 are configured to engage the corresponding threads of the inner pipes of the joint pipe elements. In this embodiment, the inner tubular boxes 630 and 640 are offset inside the housing relative to their outer counterparts 610 and 620, along the longitudinal X axis. More specifically, in this embodiment, the inner tubular boxes 630 and 640 are recessed from the outer tubular boxes 610 and 620, respectively, by distanced L1 and L2, as illustrated in FIG. 6. Distances L1 and L2 may be the same or different or even zero.

The embodiments discussed above describe a joint pipe element that can be connected either directly to another joint pipe element or indirectly, through a connector, to another joint pipe element, to form a dual, concentric, tubing system. The inner and outer pipes of such joint pipe element may be made of a same material (e.g., a metal, a composite, etc.) or from different materials. The number of teeth of the threads of the inner and outer pipes and the connector are identical so that when one joint pipe element is rotated to connect to another joint pipe element or to the connector, both the inner and outer pipes are simultaneously engaging with the corresponding inner and outer pipes of the other element or connector. The inner and outer pipes of the above discussed joint pipe elements were shown to be concentric and they can be installed in vertical or horizontal wells. They can be installed with a packer or with no packer.

Figure 8:
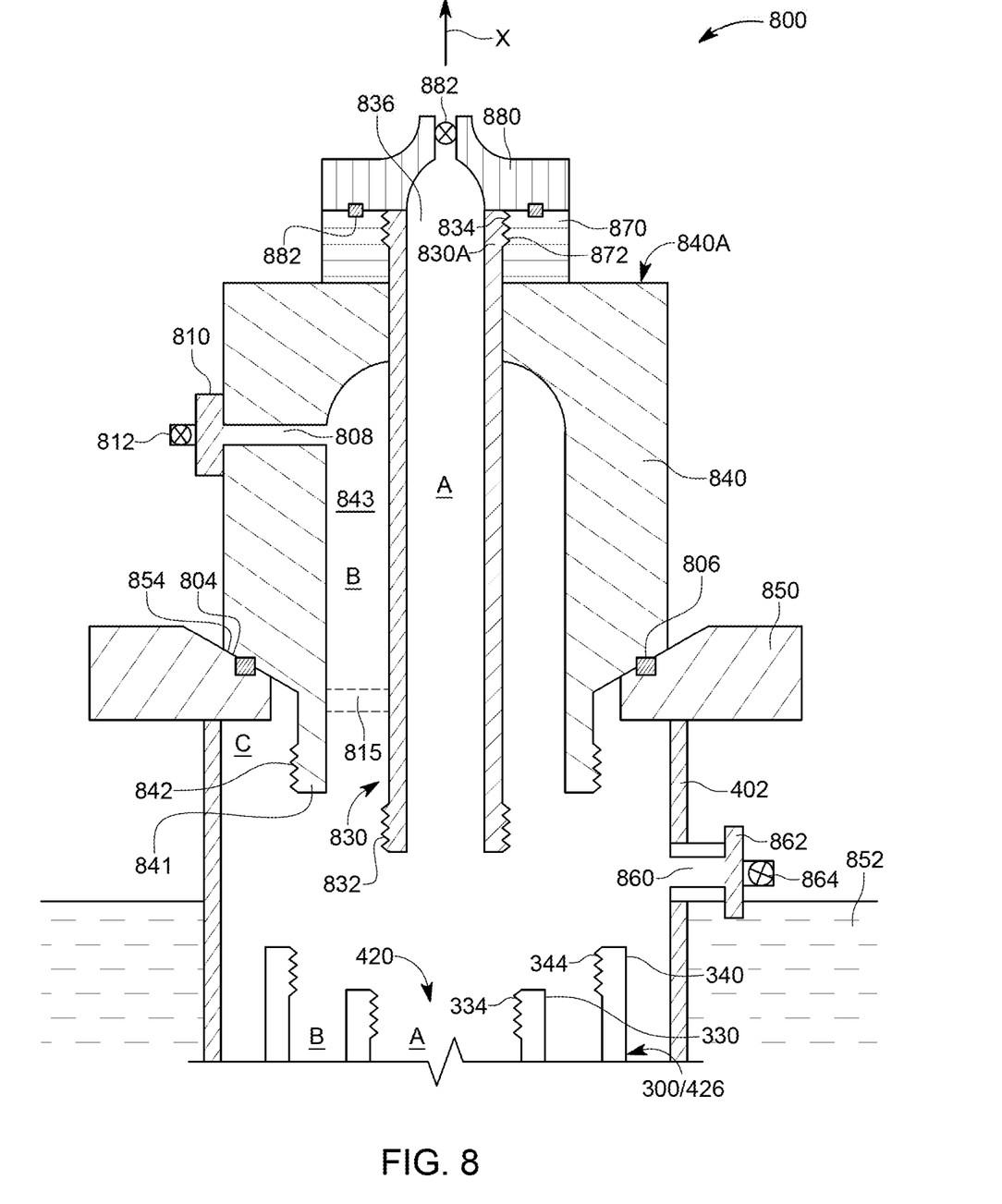
FIG. 8 illustrates a wellhead adaptor that is configured to connect to a tubing system having plural joint pipe elements.

The inner and outer tubular strings 412 and 414 need to be hung up from a wellhead 430 (see FIG. 4), which is able to independently control a flow into and out of each of these tubular strings. In this regard, FIG. 8 shows a wellhead adaptor 800 that implements these functionalities. The wellhead adaptor 800 is part of the wellhead 430. The wellhead adaptor 800 has an outer body 840 that may be sized to support the entire weight of the inner and outer tubular strings 412 and 414, or only the weight of the outer tubular string. The outer body 840 has a downstream portion 841 that is shaped as a pipe, similar to the outer pipe of a joint pipe element. The downstream portion 841 may be formed in an integrated way with the body. The downstream portion 841 has threads 842 that are configured to engage the threads 344 of the outer pipe 340 of the joint pipe element 300 of FIG. 3.

The outer body 840 has a bore 843 inside which an inner body 830 is located. The bore of the inner body 830 corresponds to the annulus A of the joint pipe element 300 and the annulus formed between the inner body 830 and the outer body 840 corresponds to annulus B of the joint pipe element 300. In one application, the annulus A of the inner body 830 is concentric to the annulus B of the outer body 840. Thus, the fluid continuity between the inner and outer tubular strings (which are made of plural joint pipe elements) is preserved and extended by the wellhead adaptor 800. The inner body 830 has threads 832 configured to engage the threads 334 of the inner pipe 330 of the joint pipe element 300. Because the threads 344, 334, 832, and 842 are identical, a top most joint pipe element 300 of the tubing system 420 may be attached to the wellhead adaptor 800 with a single rotational motion, so that both the inner and outer concentric pipes of the joint pipe element are simultaneously engaging the inner and outer bodies of the wellhead adaptor. This configuration of the wellhead adaptor and associated connecting process continue the advantageous characteristic of the tubing system 420 of having each element attached to an adjacent element by a single rotational motion while generating two concentric annuli, annulus A and annulus B.

FIG. 8 also shows the casing 402 being attached to a lower bowl 850. The casing may be welded to the bowl or attached by any other known method. The lower bowl 850 may be placed on the ground 852, just above the ground, or partially buried into the ground. The lower bowl 850 is designed to support the entire weight of the tubing system 420 and of the wellhead adaptor 800. The outer housing 840 of the wellhead adaptor 800 is shaped at its downstream end to have an inclined face 804 to matche the inclination of an upstream face 854 of the lower bowl 850 so that when the wellhead adaptor is placed on top of the lower bowl 850, a very good seal is achieved between these two elements. In this way, the annulus C is fluidly insulated from an outside of the wellhead adaptor. For further improving the seal between the two faces 804 and 854, one or more physical seals 806 may be placed at the interface between these two faces. With this configuration, the wellhead adaptor 800 may easily be attached to the tubing system 420, the wellhead adaptor 800 may support the entire weight of the tubing system, and annuli A and B of the tubing system 420 may be extended through the wellhead adaptor 800 and their pressure independence is maintained.

To control the annuli A, B, and C, various ports are formed as now discussed. One or more ports 860 (only one is shown for simplicity) are formed into the casing 402 for taking control of the annulus C. A flange 862 and a valve 864 may be connected to port 860 to control the flow of a fluid in and out of the annulus C. Similarly, one or more ports 808 (only one is shown for simplicity) are formed in the outer body 840 of the wellhead adaptor 800 so that the port communicates only with annulus B. A flange 810 and a valve 812 may be connected to port 808 to control the flow of a fluid in and out of the annulus B.

Regarding annulus A, in the embodiment shown in FIG. 8, the inner body 830 extends along a longitudinal axis X so that an upstream end 830A extends past an upstream end 840A of the outer body 840. A port 836 is present at the top most part of the inner body 830. An upper bowl 870 may have internal threads 872 that are configured to engage threads 834 formed on the upstream end 830A of the inner body 830. The upper bowl 870 is shaped to match the top most face of the outer body 840. The upper bowl 870 has a bore in which the upstream end of the inner body 830 fits. A flange 880 may be connected to the upper bowl 870 and may have a valve 882 to control a fluid access to port 836 of the inner body 830. One or more seals 882 may be located between the upper bowl 870 and the flange 880 for preventing a fluid from the port to escape the flange. Note that port 836 corresponds to annulus A.

While FIG. 8 shows the threads 832 and 842 of the inner and outer bodies formed as tubular pins, it is possible to have the threads formed as tubular boxes, or as a mixture of a tubular pin and a tubular box, depending on the actual configuration of the top most joint pipe element 300. In addition, it is possible to have the top most pipe element 300 directly connected to a connector 426 and the connector 426 to be directly attached, also with a single rotational motion, to the downstream ends of the wellhead adaptor 800.

Inner body 830 may be attached to outer body 840 in various ways. For example, in FIG. 8, there are lugs 815 (similar to lugs 360 shown in FIG. 3 for the joint pipe element 300) that are placed between the inner and outer bodies and then the lugs are welded to one or both bodies 840 and 830. Also similar to the joint pipe element 300, it is possible to have grooves in the bore of the outer body and to slide the lugs into those grooves and then to weld the other side of the slugs to the inner body. No matter which method is used to attach the inner body to the outer body of the wellhead adaptor, the two bodies should be connected to each other in such a way that a torque transmitted to the outer body is automatically transmitted to the inner body and vice versa, as for the case of a joint pipe element.

Figure 9:
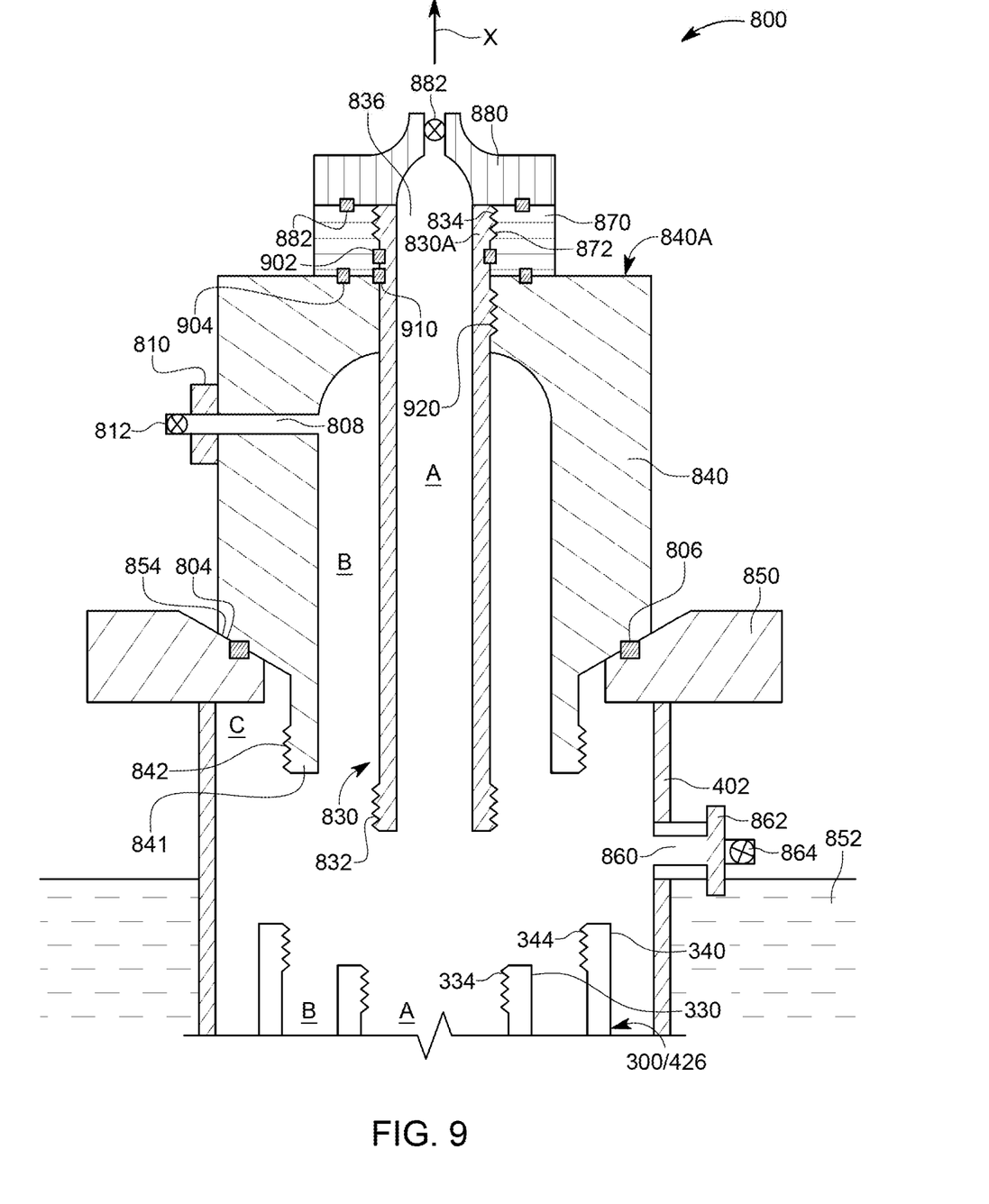
FIG. 9 illustrates a modified wellhead adaptor that is configured to connect to a tubing system having concentric tubing strings.
Figure 10:
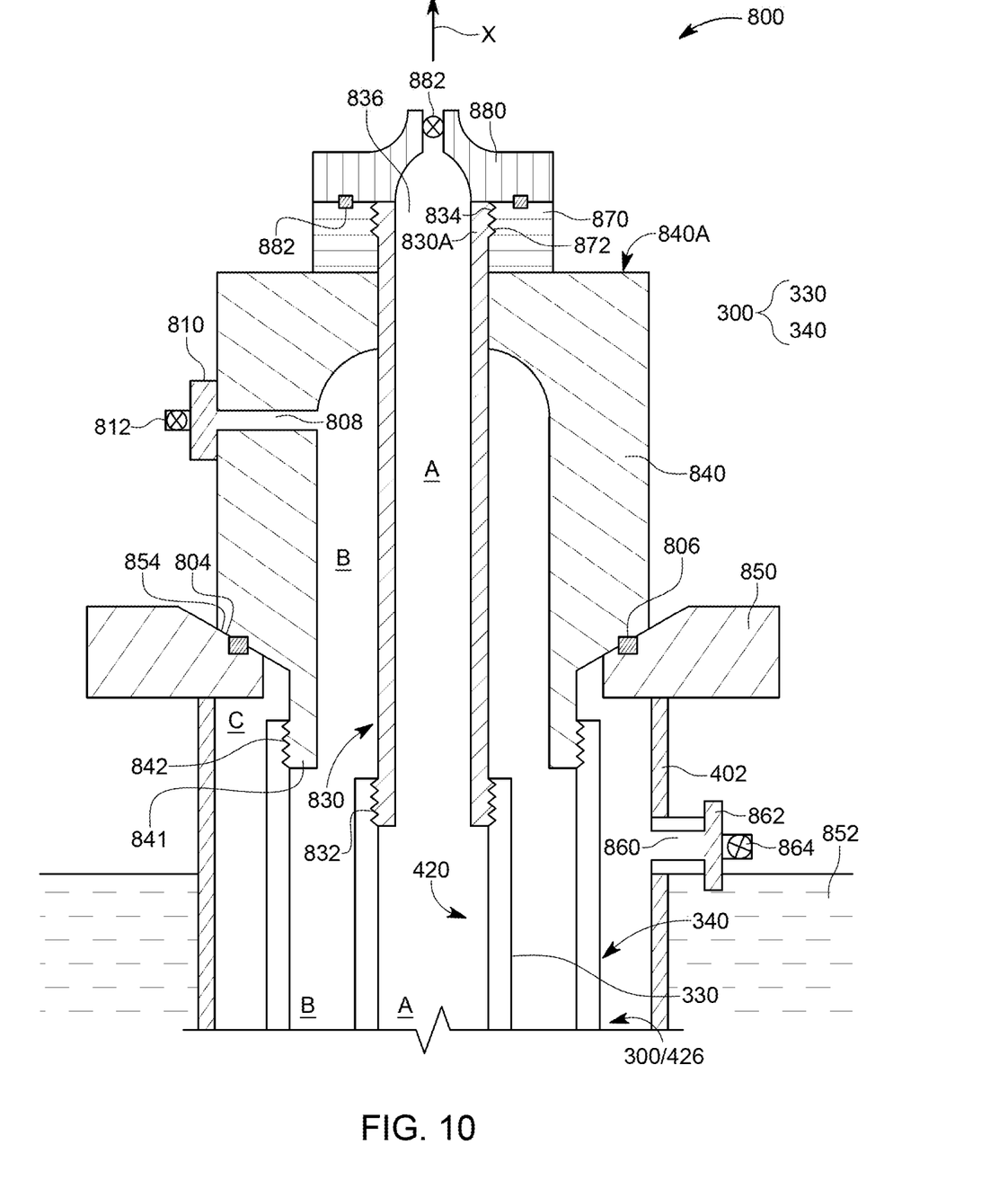
FIG. 10 illustrates the wellhead adaptor of FIG. 8 being connected to the tubing system.

In another embodiment, the weight of the inner tubing string 412, when attached to the inner body 830, makes the two bodies to achieve a good connection. Seals 902 and 904 may be placed at various locations between the inner body and the outer body to prevent loss of pressure, as illustrated in FIG. 9. It is also possible to weld the inner body 830 to the outer body with a weld 910, as also shown in FIG. 9. In another embodiment, it is possible to attach the inner body 830 with threads 920 to the outer body 840. Other mechanisms may be used for attaching the inner body 830 to the outer body 840, as long as the two bodies are attached to each other in such a way that a fluid from any annulus does not leak outside the bodies or into another annulus. No matter how the inner and outer bodies 840 and 830 are attached to each other, FIG. 10 shows the wellhead adaptor 800 directly attached to the top most joint pipe element 300 of the tubing system 420. While the embodiments of FIGS. 8 to 10 show that the wellhead adaptor 800 is directly attached to a joint pipe element, it is noted the wellhead adapter can also be directly connected to the connector 426 and the connector 426 is directly connected to the joint pipe element 300.

Figure 11:
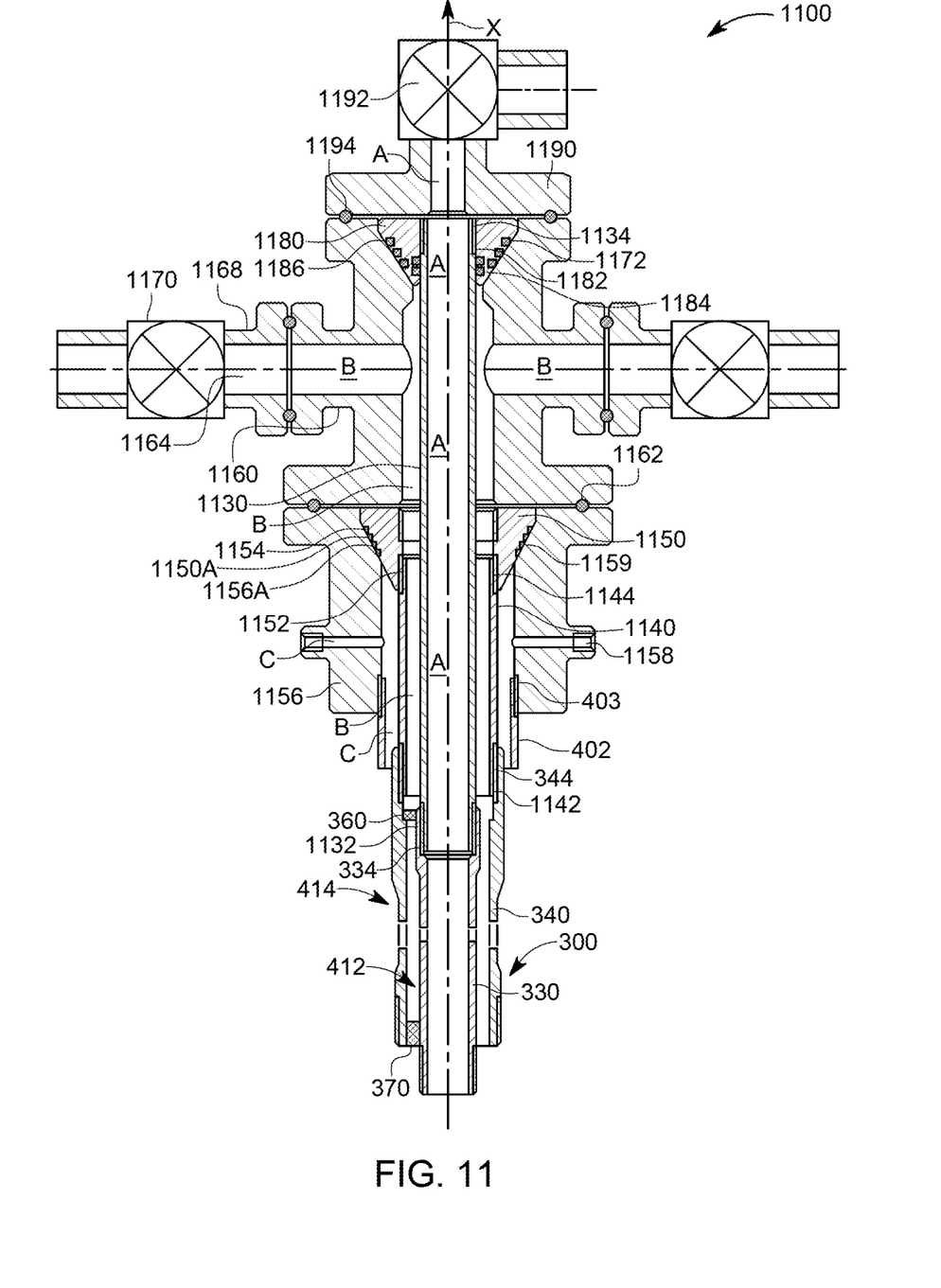
FIG. 11 illustrates another wellhead adaptor that is configured to connect to a tubing system having plural joint pipe elements.

In another embodiment, a wellhead adaptor 1100 is also configured to directly attach to a joint pipe element 300 or to a connector 426. The wellhead adaptor 1100, which is part of the wellhead 430, includes an outer body 1140 and an inner body 1130. The outer body 1140 is configured to have threads 1142 at a downstream end, which connect to the threads 344 of the outer pipe 340 of the joint element 300. The inner body 1130 is also configured to have threads 1132 that connect to threads 334 of the inner pipe 330 of the joint element 300. All these threads are sized and shaped so that the outer and inner pipes can connect simultaneously to the inner and outer bodies, with a single rotational motion. Similar to the wellhead 800 of the embodiment of FIG. 8, the threads can be formed as a tubular pin or tubular box or a mixture of them, depending on the configuration of the joint pipe element or the connector. The downstream ends of the inner and outer bodies may be aligned along the longitudinal axis X, or one end may be offset relative to the other end.

The outer body 1140 has outer threads 1144 at the upstream end, and these outer threads 1144 are configured to engage corresponding threads 1152 of a low bowl 1150. The low bowl is configured to seat in a seat 1154 formed in a low wellhead part 1156. The low wellhead part 1156 is attached to the casing 402, either by threads 403 or welded or by other means known in the art. The low wellhead part 1156 has at least one port 1158 that communicates the annulus C with the outside of the wellhead. Similar to the embodiment of FIG. 8, a valve (not shown) may be attached to this port to control a flow of a fluid in and out of the annulus C. One or more seals 1159 may be placed between the inclined face 1150A of the low bowl 1150 and the inclined face 1156A of the low wellhead part 1156 for preventing a loss of fluid and/or pressure at the interface between the two faces.

An upper wellhead part 1160 is connected to the upstream end of the low wellhead part 1156 and is configured to receive in its bore the inner body 1130. Note that the outer body 1140 stops at the low bowl 1150. Thus, in the upper wellhead part 1160, only annuli A and B are still present. Annulus C was terminated at the low wellhead part 1156. One or more seals 1162 may be placed between the upper and low wellhead parts for preventing a pressure or fluid loss at the interface between the two wellhead parts. Note that the upstream end of the low bowl 1150 and the upstream end of the low wellhead part 1156 may be flush with each other and both face the downstream face of the upper wellhead part 1160.

The upper wellhead part 1160 has at least one port 1164 that communicates annulus B to a flange 1168 that has a valve 1170. The valve 1170 is used to control a flow of a fluid in and out of the annulus B. The upstream end of the inner body 1130 has threads 1134 that connect to threads 1182 of an upper bowl 1180. The upper bowl 1180 has inclined faces 1184 that fit and seat on corresponding inclined faces 1172 of the upper wellhead part 1160. One or more seals 1186 may be located between these inclined faces to prevent a pressure or fluid from moving across an interface formed by these inclined faces.

The upstream face of the upper bowl 1180 and the upstream face of the upper wellhead part 1160 may be flush and configured to receive a flange 1190 that includes a valve 1192 for controlling a flow of a fluid in and out of the annulus A. One or more seals 1194 may be provided between the flange 1190 and the upper wellhead part 1160 and the upper bowl 1180 to prevent a pressure or fluid from moving along the interface between these elements.

Figure 12:
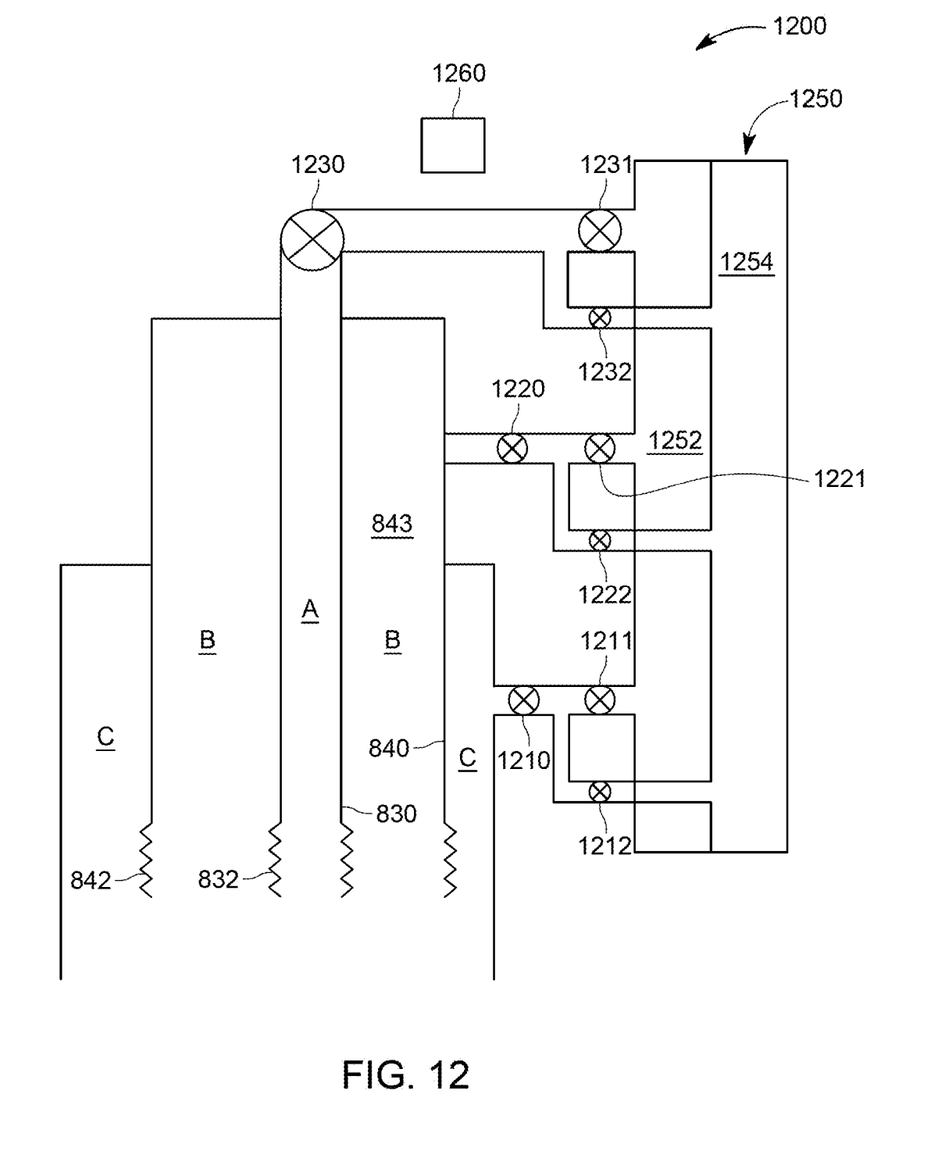
FIG. 12 schematically illustrates a wellhead adaptor that is connected between a compressor and a tubing system having two tubular strings.

The valves that control the annuli A, B and C in either the embodiment of FIG. 8 or the embodiment of FIG. 11 are connected to a surface pressure control equipment (e.g., a compressor) 1250, as shown in FIG. 12. FIG. 12 shows a wellhead adaptor 1200 (which can be the wellhead adaptor 800 or 1100), having at least three valves 1210, 1220, and 1230, one for each of the annuli A, B, and C, respectively. These may be safety valves, for example, blowout preventers, known in the art as BOP, which ensure the safety of the well in case of unexpected pressure events. Additional valves 1211, 1212, 1231, 1232, 1331, and 1332 may be installed along the pipes connecting the annuli A, B, and C to the compressor 1250 for controlling which annulus received the pressured gas, and which annulus produces the oil. Part of these valves may be connected to a suction section 1252 of the compressor 1250 and the other part of these valves may be connected to a discharge section 1254 of the compressor. A global controller 1260 may be connected (in a wired or wireless manner) to each valve so that the pressured gas from the compressor may be discharged into any of the annuli A, B, and C. The global controller 1260 may also open/close the other valves to allow oil from the well to move toward the suction section of the compressor. For example, in one application, the global controller 1260 may open valve 1222 and close valve 1221 to discharge the pressured gas from the discharge section 1254 of the compressor into annulus B, while closing valves 1212 and 1232 and opening valves 1211 and 1231 to force the oil from annuli A and C toward the suction part of the compressor.

Of course, those skilled in the art would know, based on this disclosure, to open/close these valves to achieve different flow configurations, as discussed, for example, in patent application Ser. No. 17/437,577, (the entire disclosure of which is incorporated herein by reference) entitled "Well Production Methods and Tubing System," assigned to the assignee of this application.

Figure 13:
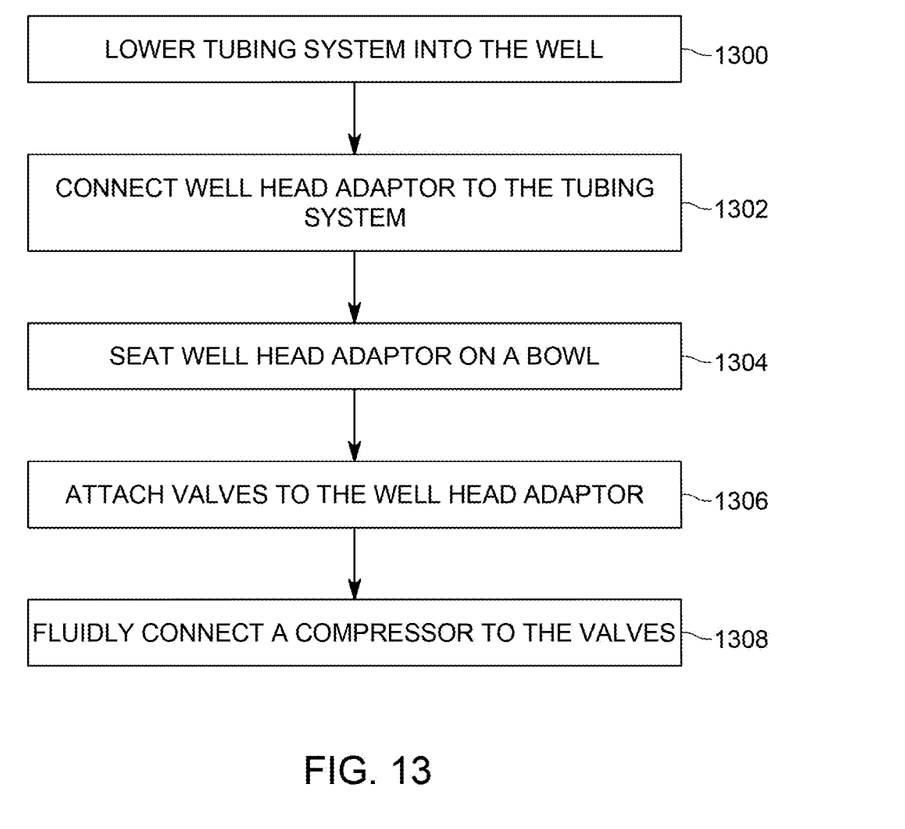
FIG. 13 is a flowchart of a method for attaching the wellhead adaptor to the tubing system.

The wellhead adaptor 1200 is shown in FIG. 12 having the ends of the bodies 830 and 840, which define the annuli A and B, configured with corresponding threads 832 and 842 for engaging a corresponding joint pipe element 300 or a connector 426. A method for achieving this connection and completing the well is now discussed with regard to FIG. 13. In step 1300, the tubing system 420 is lowered into the well, piece by piece. In step 1302, the wellhead adaptor 1200 is connected to the top most joint pipe element 300 or the top most connector 426, by a single rotational motion that engages both the inner tubing string and the outer tubing string to the inner and outer bodies of the wellhead adaptor. In step 1304, the wellhead adaptor is lowered onto one or more corresponding bowls. An upstream face of the one or more bowls is configured to contact a corresponding face of the wellhead adaptor and achieve a seal at their interface. In step 1306, one or more valves are attached to the wellhead adaptor. For example, the valves may be safety valves (BOP) and/or flow control valves as discussed above with regard to FIG. 12. In step 1308, one or more compressors are attached to these valves and configured to pump a pressured gas in one annulus of the wellhead adaptor and receive oil at another annulus of the wellhead adaptor.

The disclosed embodiments provide methods and systems for artificial gas lift of a fluid from a well. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A well system comprising:
   a wellhead comprising an inclined upper face;
   a wellhead adaptor comprising:
      an inclined lower face configured to engage with the inclined upper face of the wellhead;
      a first downstream end comprising a first set of threads;
      an inner body comprising a first bore and a central longitudinal axis;
      a second downstream end comprising a second set of threads; and
      an outer body comprising a second bore with a central longitudinal axis that is substantially coaxial with the central longitudinal axis of the first bore, such that an annular space is formed between the inner body and the outer body.

2. The well system of claim 1, further comprising an inner pipe and outer pipe of a joint pipe element.

3. The well system of claim 2, wherein the inner pipe comprises an upstream end comprising a third set of threads and the outer pipe comprises an upstream end comprising a fourth set of threads.

4. The well system of claim 3, wherein the first set of threads, second set of threads, third set of threads, and fourth set of threads are configured such that the upstream end of the outer pipe and upstream end of the inner pipe may be threaded onto the downstream ends of the wellhead adaptor using a single rotational movement of the joint pipe element about the central longitudinal axis.

5. The well system of claim 4, further comprising a plurality of joint pipe elements, each joint pipe element having concentric inner and outer pipes configured to engage with each other.

6. A method for deploying a well system comprising:
   seating on an inclined upper face of a wellhead a wellhead adaptor comprising:
      an inclined lower face;
      a first downstream end comprising a first set of threads;
      an inner body comprising a first bore and a central longitudinal axis;
      a second downstream end comprising a second set of threads; and
      an outer body comprising a second bore with a central longitudinal axis that is substantially coaxial with the central longitudinal axis of the first bore, such that an annular space is formed between the inner body and the outer body; and
   connecting the wellhead adaptor with a single rotational motion to a tubing system that includes an inner tubing string and an outer tubing string, the inner tubing string being provided within a bore of the outer tubing string.

7. The method of claim 6, further comprising:
   attaching valves in fluid communication with the wellhead adaptor; and
   fluidly connecting the valves to a compressor.

* * * * *